(No Model.) 5 Sheets—Sheet 2.
H. INGERSOLL.
CORN HARVESTER.
No. 423,770. Patented Mar. 18, 1890.

(No Model.) 5 Sheets—Sheet 3.

H. INGERSOLL.
CORN HARVESTER.

No. 423,770. Patented Mar. 18, 1890.

Fig. 3.

Hubert Ingersoll.
Inventor

Witnesses
G. S. Elliott,
C. W. Johnson

By his Attorney

UNITED STATES PATENT OFFICE.

HUBERT INGERSOLL, OF GREEN VALLEY, ILLINOIS.

CORN-HARVESTER.

SPECIFICATION forming part of Letters Patent No. 423,770, dated March 18, 1890.

Application filed November 14, 1889. Serial No. 330,296. (No model.)

*To all whom it may concern:*

Be it known that I, HUBERT INGERSOLL, a citizen of the United States of America, residing at Green Valley, in the county of Tazewell and State of Illinois, have invented certain new and useful Improvements in Corn-Harvesters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in corn or cane harvesters.

The object of the invention is to provide an apparatus or machine which will cut two rows of standing corn or cane, gather the same into loose shocks in a vertical position, deposit said shocks upon a dumping table or platform while they are still in a vertical position, and then deposit them upon the ground, the operation being automatic.

With the above object in view my invention consists in a corn or cane harvester constructed and combined as will be hereinafter specified.

In the accompanying drawings.

My improved corn-harvester is adapted to be drawn by two or more horses, which are harnessed tandem, so that one will walk in front of the other between the rows or cane, one of the horses being hitched between the shafts, which are connected to the support for the caster-wheel. The whiffletrees are connected to the central beam of the main frame, so that the draft will be directly thereon.

The frame of the harvester consists of a central longitudinal beam A and side beams A', which are rigidly connected to each other by a transverse beam or platform $A^2$. These beams are also braced by a transverse shafting, which will be hereinafter referred to.

To the under side of the side beams A', in front of the transverse beam $A^2$, are secured bearing-blocks $a\ a$, in which is journaled a shaft B, said shaft having keyed upon the outer ends thereof sprocket-wheels $b\ b$, over which pass chains $b'$, which also pass over sprocket-wheels $c$, attached to the inner sides of the supporting and driving wheels C C, said driving-wheels being mounted upon stub-shafts, which have bearing in boxes secured to the under side of the beams A' rear of the transverse beam $A^2$. About centrally upon the main driving-shaft B are rigidly keyed two gear-wheels $b^2\ b^2$, and near the ends thereof are loosely mounted miter-wheels $b^3$, said miter-wheels having a clutch-face, which meshes with a spring-actuated clutch sliding upon the main shaft and serves to prevent backward movement of the miter-wheels. These miter-wheels mesh with miter-wheels $b^4$, mounted upon short vertical shafts supported in projecting bearings, which shafts carry the rotary cutters D.

Upon the center beam A is mounted a shaft $d'$, carrying gear-wheels D', which mesh with gear-wheels placed upon a transverse shaft $D^2$, supported by projecting hangers $e'$, extending forward from the transverse beam $A^2$. This shaft $D^2$ has near its ends miter-gears, which mesh with gears $e$, mounted upon the shafts E, said shafts being supported at their lower ends in the projecting hangers $e'$, hereinbefore referred to, and at their upper ends in suitable bearings attached to the superstructure. These vertical shafts E carry gathering-arms E'.

The side beams A' have rigidly attached thereto three or more vertical beams 1, 2, and 3, and at a slight distance above the longitudinal beam A' is secured to and supported by the vertical beams 1, 2, and 3 a horizontal guide-board 4, the front inner portion of which is cut away to provide a throat or passage-way, and near the upper ends of the beams 1 2 3 is secured a similar guide-board 5.

The center beam A supports a front vertical beam 6, central beam 7, and a rear standard 8, which are braced to each other by longitudinal strips, which serve other purposes than mere braces. Between the vertical beams or uprights 6 and 7 are secured guide-boards or frames 9 and 10, the outer edges of which are constructed to form the inner sides of the guides to the throat or passage-way, which are intersected by the gathering-arms E' and rotary knives or cutters D. The guides 9 extend forwardly beyond the beam 6, so as to reach or extend beyond or on a line with the central beam A and rest upon a block attached to the said vertical beam. The driver's seat is located above these guides 9.

28 refers to a horizontally-reciprocating frame, to the upper and lower ends of which are attached platforms or supports for pivoted horizontal plates 25, the forward ends of which are provided with a spring 26, which is attached to the forward ends of the plates and tends to draw the front ends together and throw the rear ends outwardly, the inward movement of the forward ends of the plates 25 being limited by stops 27, attached thereto, which abut against the outer edges of the platforms, to which the plates 25 are secured by pivots $n$, these parts being attached to the reciprocating frame above the connecting-strip 29, upon which said frame slides, and a similar arrangement is provided at the lower end of the frame directly above the guide-board 9. The object of the pivoted plates is, first, to hold the stalks within the throats or guideways, and, second, to push said stalks beyond said throats and upon the platform when the reciprocating frame moves rearward, and in order that the said frame may move freely it is provided near its upper end with an anti-friction roller, which travels on the upper surface of the connecting-strip 29, and an upward movement of the reciprocating frame is prevented by the stop located immediately beneath the said connecting-strip. Toggle-levers 32 and 33 are pivoted to the upright 6 at one end and at the other to the ends of the reciprocating frame 28, and these levers are connected by a connecting bar or link 34, the movement of the levers, and in consequence the frame, being occasioned by a bent bail 37, which is connected to the connecting-bar 34 and to the cog-wheels D'. By means of this construction the reciprocating frame 28, which carries the pushing mechanism, hereinbefore described, is caused to reciprocate when the wheels D' are rotated from the driving-wheels and intermediate connections. The stops 27, attached to the pivoted plates 25, abut against the outer edges of the rigid plates, to which they are pivoted by bolts or pins $n$.

As far as described, my invention operates as follows: When the corn or cane harvester is drawn across the field, the stalks enter the openings on each side of the shafts between the side and center beams, and the vertical shafts carrying the arms E' rotate to carry the stalks in a vertical position rearwardly, and the rotary knives sever the stalks. In their rearward movement the stalks are carried beyond the throats formed by the horizontal plates, and as the horizontally-reciprocating frame moves the pivoted plates carried thereby are pressed inward by the stalks, after which the stalks are pushed by the plates out of the throats either upon the ground or are held in a vertical position above the platforms. This portion of my apparatus may form a harvester or machine, which can be used independent of the pivoted platforms and stalk-supports or shock-formers, and will be useful in cutting broom-corn, sugar-cane, &c., where it is simply desired to cut and deposit the stalks upon the ground.

Figure 1:
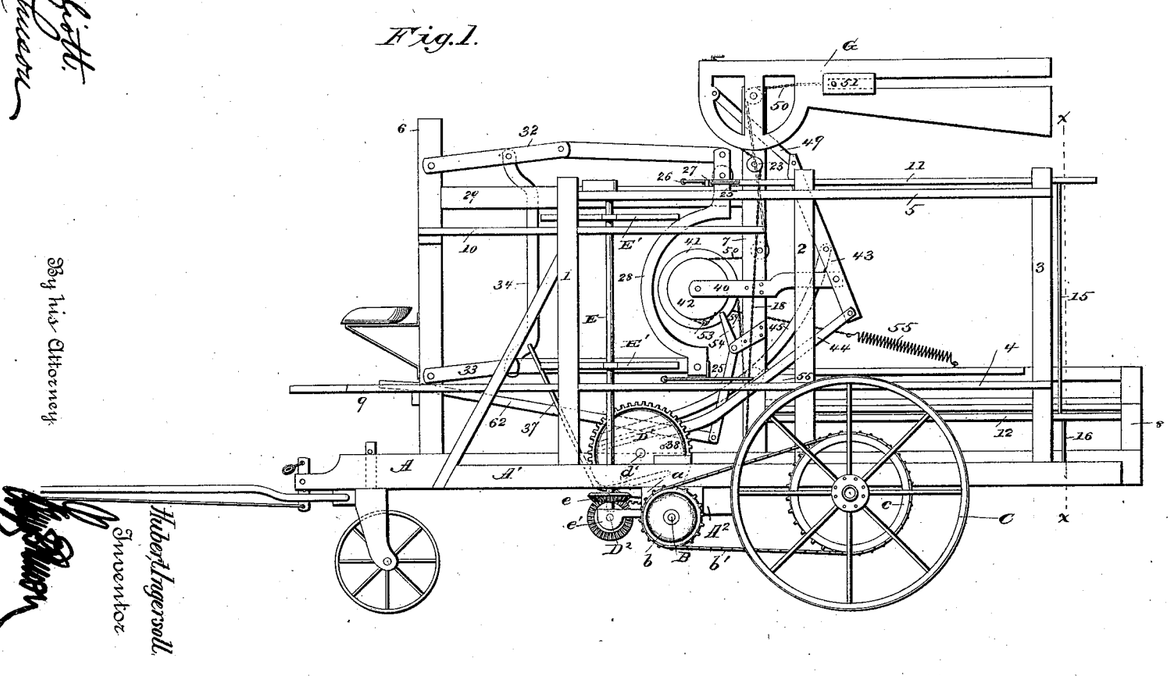
Figure 1 is a side view of a cane or corn harvester constructed in accordance with my invention.
Figure 2:
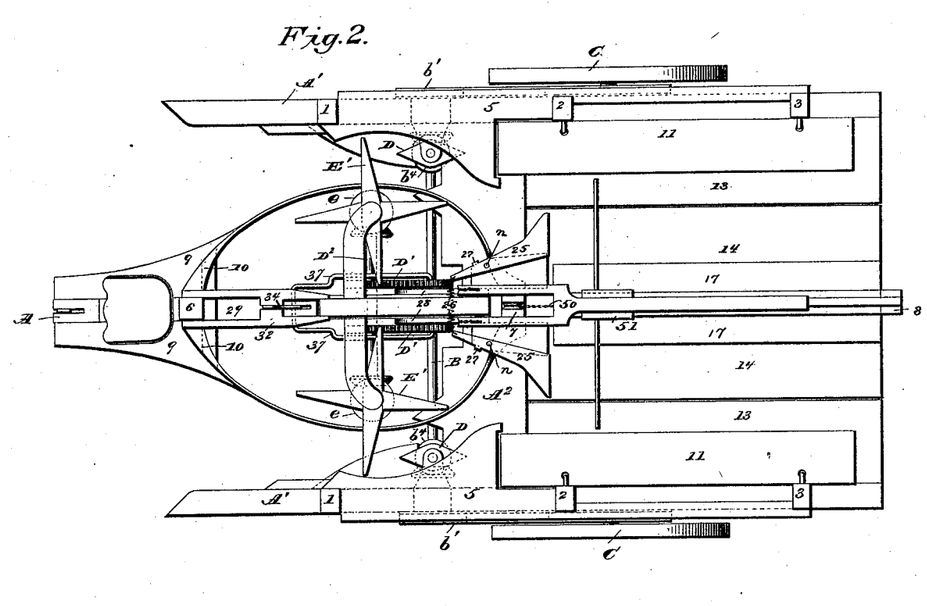
Fig. 2 is a plan view.
Figure 3:
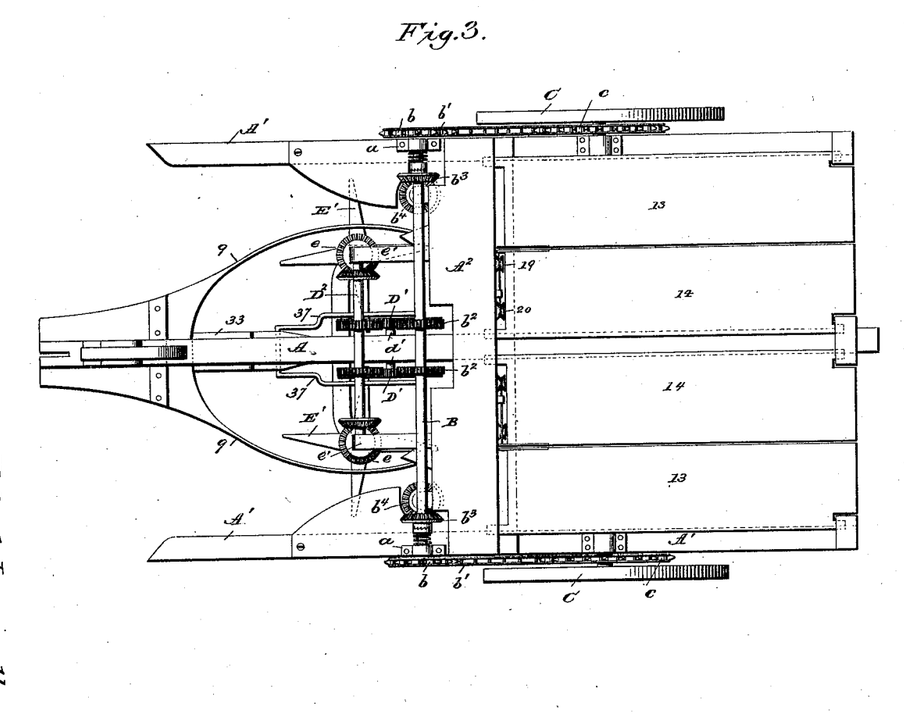
Fig. 3 is a bottom view.
Figure 4:
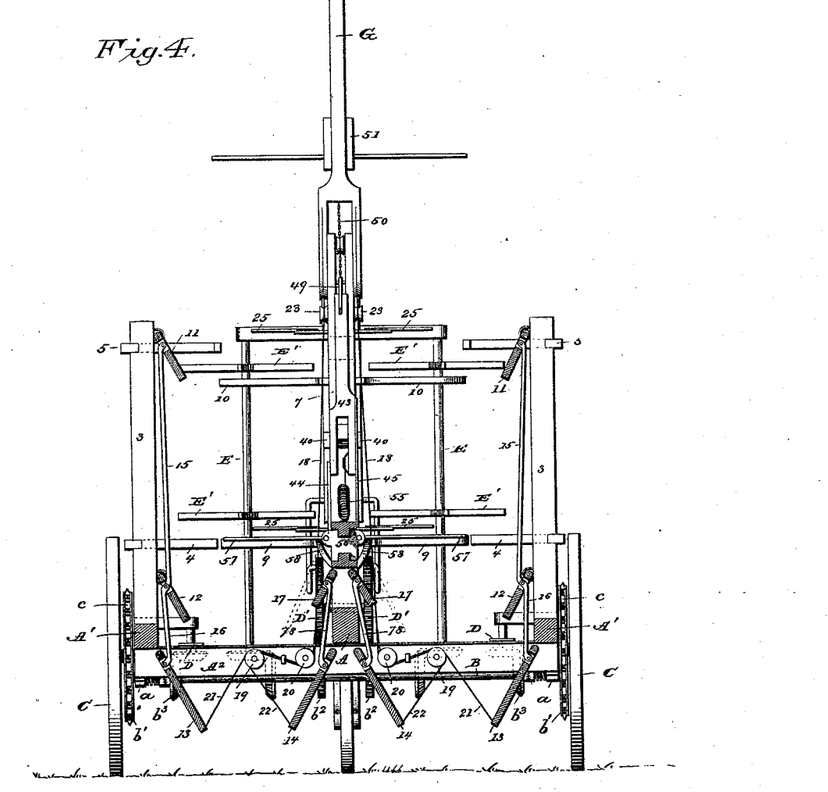
Fig. 4 is a rear elevation, partly in section, the section being taken on the line $x\ x$ of Fig. 1.
Figures 5, 6, 7:
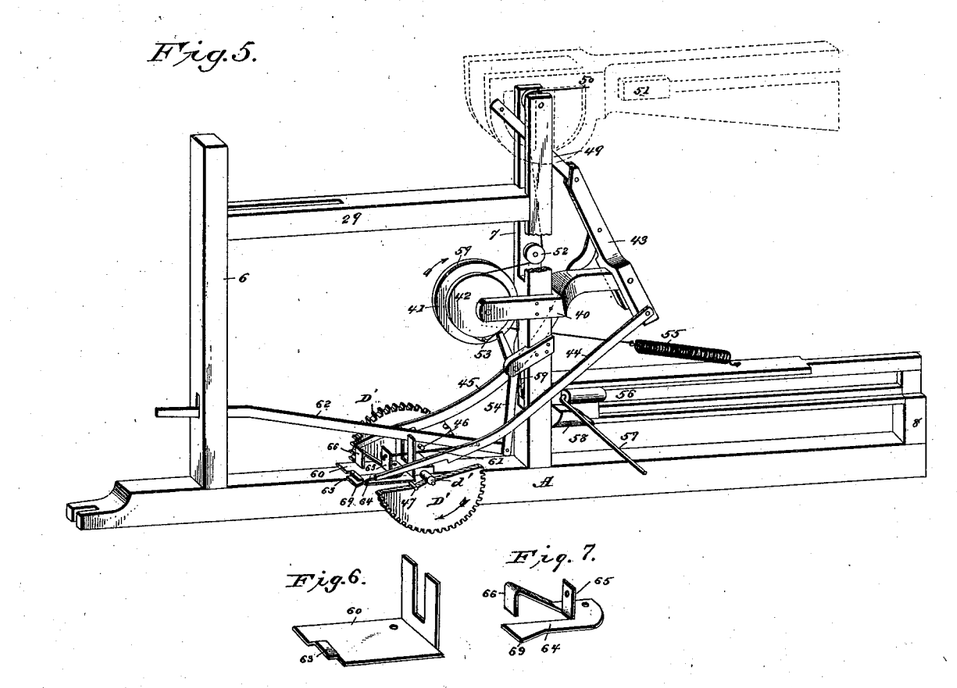
Fig. 5 is a detail perspective view of the central beam with the mechanism for operating the hinged platforms.
Figs. 6 and 7 are detail views.

The upright 7 has attached thereto a longitudinal cross-piece 40, which is bifurcated to embrace the said upright, and at its forward end receives a disk 41, which has formed therewith a smaller disk 42, and to the rear end of the support 40 is pivoted a lever 43, to the lower end of which is pivotally attached a bar 44, while above the pivotal point of the lever 43 a bar 45 is secured. These bars 44 and 45 have their free ends cut away to form shoulders, which engage with projecting pins 46 and 47 on the inner faces of the gear-wheels D', which turn in the direction indicated by the arrow, Fig. 5. The upper end of the lever 43 is bifurcated to receive the lower end of a pivoted bar 49, which passes through the slotted standard or beam 7, and is pivoted to the open-ended or bifurcated end of the pivoted arm or vane G, which is pivoted to the upper end of the said standard. The upper end of the standard is also provided with a roller over which passes a flexible connection 50, said connection being attached to a sliding block 51, carried by the vane and having laterally-projecting arms, as shown. This slide 51 moves in a slot or groove in the vane G, and the flexible connection 50, attached thereto, passes over the pulley at the upper end of the standard downward and partially around the guide-pulley 52, and from thence over the periphery of the disk 42, to which it is attached. The side of the disk 41, beyond the periphery of the disk 42, has a pin 53, which projects therefrom to operate the upper end of a lever 54, pivotally supported in a bracket secured to the standard 7. The disks are brought to their normal position after being operated by the flexible connections hereinbefore referred to by the resiliency of the spring 55, one end of said spring being connected to the disk near its axis, while its other end is made fast to the upper guide for the block 56. This block carries pivoted arms 57, which, when the block is at the forward limit of its movement, assume a horizontal position occasioned by their riding upon the inclined blocks 58. The sliding block 56 has a flexible connection 59 attached thereto, which passes over a suitable pulley journaled in the standard 7, said cord passing around the periphery of the disk 41 and is attached thereto. Between the standards 7 and 8 are suitable longitudinal guide-strips, between which the recessed block 56 slides.

To the main beam A, between the uprights 6 and 7, is secured a casting 60, which has a bifurcated vertical portion, through which pass a rod 61 and forwardly-projecting lever 62, the rear end of this lever being connected to the lower end of the lever 54. The forward end of the casting 60 is shaped to form a guide 63 beneath which lies one of the forward ends 69 of a pivoted plate 64, the opposite end being bent to present an inclined surface 66, the pivot of the plate being rear of the upwardly-bent portion 65 thereof. The outer edge of the arm 69 of the pivoted plate is beveled, as shown. The forward end of the rod 61 is connected to the upwardly-projecting portion of the pivoted plate to one side of its pivot, so that when the rod is drawn upon the arms of said plate will be thrown to one side, so that the bar 45 may drop and be engaged by the pin projecting from the gear-wheel D'. The projecting pin 53 on the side of the disk 41 is so located that when said disk is rotated or turned, as it is by the cornstalks abutting against the projecting arms carried by the blocks 51 and 56, this pin will move the upper end of the lever 54 forwardly and the lower end rearwardly, which will draw upon the rod 61 to throw the pivoted plate to one side, as hereinbefore stated. This operation can also be accomplished by throwing the lever 62 rearward, which can be done from the driver's seat. When the bar 45 drops, it will be engaged by the pin 46 on the gear-wheel D' and thrown rearward, which movement will throw the upper end of the lever 43 rearward, and by means of the connecting-bar 49 will elevate the rear end of the vane G and slacken the flexible connections 18 to permit the pivoted platforms to drop, as will be hereinafter set forth. The vane is lowered by the bar 44, pivoted below the pivotal point of the lever 43, engaging with the pin 47, which operates to throw the lower end of the pivoted lever 43 rearward, and by reason of its link-connection with the vane will lower the same and close the platforms. The pivoted bars 44 and 45 operate alternately, and when the arm 69 of the pivoted plate 64 is thrown beneath the bar 45 by reason of the bar 44 engaging the beveled edge of said plate this operation ceases, and is renewed either by the operation of the lever 62 or by means of the stalks pushing upon the projecting arms secured to the blocks 51 and 56, and operating, by means of the flexible connections, the disks 41 and 42 to cause the pin 53 to engage the lever 54 and throw the parts into an operative position, as hereinbefore described.

It will be observed that the disks 41 and 42 are of different sizes and that the rope 59 will pay out faster than the rope 50. This construction is for the purpose of permitting the lower block, with its arms, to move faster than the upper block, so as to keep the ropes taut, as the lower portion of the shock increases in size more rapidly than the upper portion.

To the vertical beams 2 and 3 are secured hinged boards or wings 11 and 12, while on a line with the under sides of the beams A' are similarly-hinged boards 13, which form sections of the platform, the opposite sections being made up of boards 14, hinged to the central beam A. The wings or hinged boards 11, 12, and 13 are connected to each other by rods 15 and 16, which are pivoted in suitable slots to cause the board to move in unison, and the boards 14 are connected to the hinged boards 17 by connections 78. The boards 17 are hinged or pivoted between the uprights 7 and 8. The hinged sections of the platform 13 and 14 open by gravity, while they are elevated by flexible connections, which pass through suitable pulleys and connect with the mechanism hereinbefore described.

Upon the rear vertical edge of the transverse beam $A^2$ are journaled grooved rollers or sheaves 19 and 20, over which pass flexible connections 21 and 22, which are attached to the free ends of the platform-sections 13 and 14, and extend therefrom over said sheaves 19 and 20 upwardly, and are connected to a single flexible connection 18, which passes over grooved rollers or sheaves 23 to the forward end of the pivoted weighted arm or vane G, the lower front portion of which is rounded and grooved to form guides for the flexible connection 18, which is attached thereto, so that when the vane is raised the sections of the platform will open and allow the corn thereon to be deposited upon the ground. The hinged boards 11 and 12, moving in unison with said platform, tend to give the corn a slight downward movement, which will better free it from the superstructure of the harvester.

Heretofore in the description I have described the operation of my invention as far as it relates to gathering the stalks in the passage-ways or throats, cutting the same, and pushing or projecting them rearwardly out of the throat and past the front portion or plate $A^2$, rear of which are located the platforms. The stalks as they are pushed rearwardly by the pivoted plates carried by the reciprocating frame are forced against the horizontally-projecting arms carried by the blocks 51 and 56, and the rearward pressure against these arms, caused by the plates carried by the reciprocating frame, moves the blocks rearwardly and in their rearward movement draws upon the cords attached thereto, which pass over the grooved disks 41 and 42 to cause the rotation of said disks in a direction indicated by the arrow, and the projecting pin 53 abuts against the lever 54 and automatically throws the pivoted plate mounted above the casting 60 out of position, so that the forwardly-extending bar 45 will drop and be in such a position as to be engaged by the pin 46, which, contacting with the shoulder thereof, will actuate and move the upper portion of the lever 43 rearwardly, which, drawing upon the bar 49, elevates or raises the vane G. The flexible connections which pass partially around the curved portion of the vane are slackened, which allows the platform to swing open. When the platforms move downwardly, the motion is also communicated to the wings 11, 12, and 17 through the intervention of the rods 15, 16, and 78. Thus, when the platforms are thrown open or dropped, the space is increased, and the edges of the said hinged boards 11, 12, and 17 assist the downward movement of the stalks or shock. The stalks up to this time have been in an upright position, and when the platforms are opened they fall upon the ground parallel with the line of draft of the apparatus and can be readily made into a shock, if desired. The size of the shocks can be regulated by shortening the cords attached to the blocks 51 and 56. The arms 57 are pivoted to the block 56 and are held when said block is at the limit of its forward movement in a horizontal position, and these lower arms are held in such position by contact with the stalks until the platforms are opened. Simultaneously with the rear movement of the bar 45 the bar 44 moves forwardly and pushes the pivoted plate carried by the casting 60 into position, after which the pin 47 engages with the shoulder thereof and moves the lower end of the lever 43 rearward, thus bringing the parts back to their original position, and they will not act automatically, as previously stated, until the pin upon the disk 41 again contacts with the lever 54, or the lever 62 is operated.

It will be observed that the disks 41 and 42 are operated in a direction opposite to that indicated by the arrow by the spring 55, which not only moves said disk, but keeps the flexible connections taut.

The hereinbefore-described corn-harvester is adapted to cut and form into loose shocks two rows of corn or cane at the same time, and may be built to be comparatively light. In the drawings the machine is shown as being excessively high, which is done for the purpose of better illustrating the parts; but in practice it will be so constructed that the laterally-projecting arms carried by the block 51 will be several feet—say three or four—below the top of ordinary cane or corn. Further, this device is adapted to cut and gather all kinds of stalks usually cultivated in rows, and the application of my invention is not limited merely to a corn-harvester.

I claim—

1. In a stalk cutter and gatherer, a frame provided with cutting mechanism, supporting and drive wheels therefor, passage-ways for the stalks, reels or vertical rotary shafts having arms intersecting said passage-ways, and a central reciprocating frame having pivoted and spring-actuated plates adapted to move said stalks when cut beyond the reels, substantially as set forth.

2. In a stalk cutter and gatherer, a frame provided with supporting-wheels and rotary cutters, vertical shafts having projecting arms, and a central reciprocating frame carrying plates upon which are secured pivoted plates which are adapted to project into the passage-ways of the stalks on the return movement of the frame and move the stalks rearwardly beyond the cutters and arms of the reel, substantially as and for the purpose set forth.

3. In a stalk cutter and gatherer having passage-ways for the stalks, cutters, and shafts carrying reels or projecting arms, a central reciprocating carrier-frame, the upper and lower ends thereof being provided with toggle-levers which connect said reciprocating frame and the main frame, said toggle-levers being connected to each other by a bar, and a bail connecting said bar to gear-wheels which mesh with gears on shafts rotated by the driving-wheels, substantially as shown.

4. The combination, in a stalk cutter or harvester, of a frame supported upon wheels, as shown, and provided with a transverse driving-shaft B, said shaft having clutches, sprocket-wheels over which a driving-chain passes, said chain engaging with a sprocket-wheel $c$, cog-wheels $b^2$, mounted on said shaft and meshing with cog-wheels $D'$, the shaft B, carrying beveled pinions for operating the shafts upon which the rotary knives or cutters are mounted, a shaft $D^2$, having gear-wheels, which mesh with the gear-wheels $D'$, and beveled pinions for turning the reel-shafts, the gear-wheels $D'$ being connected by a bent bail to a bar which operates in its movement a reciprocating frame, said reciprocating frame carrying mechanism for moving the stalks rearwardly, substantially as shown, and for the purpose set forth.

5. The combination, in a stalk cutter and gatherer, with the rotary knives and reels which intersect the throat or passage-way of the stalks, of a reciprocating frame mounted on a longitudinal support or bar and provided at its upper and lower ends with toggle-levers which are connected to a fixed support or standard, a bar connecting said toggle-levers and having a bail which is attached to the gear-wheels $D'$, so that the toggle-levers will be raised and lowered and the frame connected thereto reciprocated when the gear-wheels rotate, said reciprocating frame carrying means which contact with the stalks and move the same rearwardly beyond the reels and cutters, substantially as and for the purpose set forth.

6. In a stalk cutter and gatherer, a frame consisting of a main or central beam A and side beams A', standards extending vertically therefrom and provided with projecting boards, the forward ends of which are so constructed as to provide converging throats or passage-ways for the stalks, a transverse driving-shaft having gear-wheels, a rigid platform rear of the cutters, a short transverse shaft connected to the driving-shaft by gear-wheels D' and pinions, said shaft operating vertical shafts having projecting arms or reels, and a central reciprocating frame, also operated by the gear-wheels D', said reciprocating frame carrying at its upper and lower ends projecting plates, the rear ends being at right angles with the throat or passage-way of the stalks, pivoted plates supported thereby, said plates converging forwardly, so as to provide inclined portions which will pass around the stalks in their forward movement, said plates being connected at their front ends by springs, so as to project the rear ends thereof outwardly in their rearward movement, said pivoted plates being adapted to extend partially over the throat or passage-way of the stalks, substantially as and for the purpose set forth.

7. In a stalk cutter and gatherer, the combination, with the cutting mechanism, reels, and reciprocating carrier-frame, substantially as described, of a central support carrying a pivoted vane G, swinging in a vertical plane, and a flexible connection attached to a sliding block carried by said vane, said block having projecting arms engaged by the rearwardly-moving stalks, the flexible connection being attached to a trip to set in motion means for automatically elevating the vane and dropping the hinged platforms, as set forth.

8. In a cornstalk cutter and harvester, the combination of a standard carrying at its upper end a vane G, provided with a forward bifurcated portion through which the pivot-pin passes, and a longitudinal slot or guide, flexible connections secured to the forward portion of said bar, and a flexible connection attached to a block sliding in said slot, having projecting arms, said flexible connections leading, respectively, to the pivoted platforms and to the periphery of a disk, a spring for moving said disk in one direction, lever 43, having bars pivoted thereto on each side of its fulcrum, which extend forwardly, said bars having shoulders, said lever 43 being connected at its upper end to the vane G by a link, a pivoted lever 54, the upper end of which is adapted to engage with a projecting pin on the disk, a rod connected to the lever 54, so as to engage with and turn a pivoted plate having angular portions, against one of which the end of the bar 44 abuts to return the pivoted plate, gear-wheels having projecting pins for engaging the shoulders on the bars 44 and 45, substantially as shown, the other angular portion of the pivoted plate being for the purpose of holding the bar 45 out of engagement with its pin, and for the purpose set forth.

9. As a means for operating hinged platforms so as to open and close the same, the combination of a pivoted bar or vane G, having a curved portion around which pass flexible connections which extend to the platforms, and flexible connections attached to sliding blocks 51 and 56, operated by the rearwardly-moving stalks, said connections passing around a disk having a projecting pin for actuating a lever so as to automatically place in position bars 44 and 45, which operate the pivoted bar 43 so as to raise and lower the vane G, substantially as and for the purpose set forth.

10. In a corn-harvester, the combination, with the gear-wheels D', and having on their inner faces projecting pins, bars 44 and 45, adapted to be actuated thereby, so as to operate hinged platforms, of a casting 60, having an upwardly-projecting bifurcated portion and a pivoted plate with vertical and lateral inclines, the former to throw the bar 45 out of engagement with its pin and the latter to engage bar 44 to return the pivoted plate to its normal position, also a vertical portion on said pivoted plate having an opening through which passes a rod for shifting the pivoted plate, said rod connecting with a lever 54, substantially as shown, and for the purpose set forth.

11. In an automatic platform-operating mechanism for corn-harvesters, the combination of the weighted vane G, a bar 49, connecting the same to the upper end of a pivoted lever 43, gravity-bars 44 and 45, connected to said lever below and above its pivot, respectively, and adapted to be automatically thrown into engagement with studs which project from the inner faces of the gear-wheels D', a spring-actuated disk over which pass flexible connections attached to sliding blocks and flexible connections extending from the pivoted vane to the platforms, a pivoted lever 54, operated by the disk and having attached thereto a forwardly-projecting bar for manually operating said lever, and a rod for automatically throwing the bars into engagement with their studs, the parts being organized so that when the sliding blocks are moved rearwardly the mechanism hereinbefore referred to will be operated, so as to open the platforms and deposit the load carried thereby, substantially as and for the purpose set forth.

12. The combination, with the hinged platforms and mechanism for operating the same, as shown, of a series of hinged boards 11, 12, and 17, arranged above the platforms, adapted to project inwardly when the platforms are closed, said boards having bars for connecting the same to the platforms, so as to operate in unison therewith, for the purpose set forth.

13. The combination, with a hinged platform, of a sliding block 56, supported in a horizontal guideway and provided with pivoted projecting arms 57, and a block attached to the forward portion of said guideway and having an inclined surface terminating in a horizontal portion, so as to maintain said arms in a horizontal position when they rest upon said block, substantially as shown.

14. In a corn-harvester, the combination of a central beam carrying at its forward end a caster-wheel, parallel side beams A' A', said beams being connected to each other by a central transverse beam or stationary platform $A^2$, drive-wheels mounted on stub-axles and provided with sprocket-wheels $c$, over which pass chains for operating the main shaft B, a shaft $D^2$, located in front of said main shaft and geared therewith by gear-wheels D' and pinions, beveled wheels or pinions attached to the shafts B and $D^2$ for operating cutters and reels, plates attached to the central and side frames, so as to provide converging passage-ways, which are intersected by the reels and rotary knives, and hinged platforms rear of the stationary platform, vertical beams or standards carrying a reciprocating frame, blades pivoted to said reciprocating frame for moving the stalks rearward and over the stationary platform, a pivoted vane G, carrying a sliding block having laterally-projecting arms and a lower sliding block held in a guideway, said block carrying pivoted arms or rods, flexible connections extending from these sliding blocks to a double-faced disk having a grooved periphery, said disk having a projecting stud for automatically operating a lever which sets bars 44 and 45 in action, said bars being adapted to operate a lever which is connected to the vane G, so as to raise and lower the same, and flexible connections extending from said bar to the platform, the parts being constructed and organized substantially as shown, whereby the stalks are gathered in the throat, moved in contact with the cutters by the revolving reels, and then moved rearward over and beyond the stationary platform, so that the stalks will contact with the projecting arms of the sliding blocks, and when said sliding blocks, which are located above the platform, reach the limit of their movement the platform will automatically dump or open to deposit the stalks, the parts again automatically resuming their position, substantially as set forth.

In testimony whereof I affix my signature in presence of two witnesses.

HUBERT INGERSOLL.

Witnesses:
GEORGE H. SMALL, Jr.,
HENRY SAAL.